(12) United States Patent
Cantrill

(10) Patent No.: US 7,454,740 B1
(45) Date of Patent: Nov. 18, 2008

(54) METHOD AND APPARATUS FOR CACHING PREDICATES IN A TRACING FRAMEWORK

(75) Inventor: Bryan M. Cantrill, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 10/713,412

(22) Filed: Nov. 14, 2003

(51) Int. Cl.
*G06F 9/44* (2006.01)

(52) U.S. Cl. .................. 717/100; 709/224; 717/105; 717/127; 717/128

(58) Field of Classification Search ............... None
See application file for complete search history.

(56) References Cited

U.S. PATENT DOCUMENTS

| | | | | |
|---|---|---|---|---|
| 5,894,575 | A * | 4/1999 | Levine et al. | 717/128 |
| 6,493,686 | B1 * | 12/2002 | Francone et al. | 706/12 |
| 6,493,868 | B1 * | 12/2002 | DaSilva et al. | 717/105 |
| 6,658,471 | B1 * | 12/2003 | Berry et al. | 709/224 |
| 6,678,883 | B1 * | 1/2004 | Berry et al. | 717/128 |
| 6,728,949 | B1 * | 4/2004 | Bryant et al. | 717/127 |
| 6,807,583 | B2 * | 10/2004 | Hrischuk et al. | 719/318 |
| 6,931,632 | B2 * | 8/2005 | Ramasamy et al. | 717/130 |
| 7,058,928 | B2 * | 6/2006 | Wygodny et al. | 717/128 |
| 7,096,499 | B2 * | 8/2006 | Munson | 726/23 |

OTHER PUBLICATIONS

Tamches, Ariel and Miller, Barton P; Fine-Grained Dynamic Instrumentation of Commodity Operating System Kernels; [Online]; http://www.usenix.org/publications/library/proceedings/osdi99/full_papers/tamches/tamches.pdf, Published Feb. 1999.

Murayama, John; "Performance Profiling Using TNF"; [Online]; http://developers.sun.com/solaris/articles/tnf.html, Jul. 2001.

Lorch, Jacob R. and Smith, Alan J.; "The Vtrace Tool: Building a system Tracer for Windows NT and Windows 2000"; [Online] http://msdn.microsoft.com/msdnmag/issues/1000/Vtrace/default.aspx, Oct. 2000.

"Chapter 10. The Generalized Trace Facility (GTF)"; [Online]; http://publib.boulder.ibm.com/cgi-bin/bookmgr/BOOKS/IEA2V100/CCONTENTS, Jan. 2001.

Mirgorodskii, Alex; "The Path to Portable Kernel Instrumentation: The Kerninst API"; http://www.dyninst.org/mtg2003/slides/KerninstAPI.pdf, Apr. 2003.

Richard Moore, et al.; "IBM Dynamic Probes"; http://www-124.ibm.com/developerworks/opensource/linux/projects/dprobes/README, 2000.

K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

*Primary Examiner*—Wei Y. Zhen
*Assistant Examiner*—Phillip H Nguyen
(74) *Attorney, Agent, or Firm*—Osha · Liang LLP

(57) ABSTRACT

A method for caching in a tracing framework, including firing a probe associated with a thread, evaluating a first predicate of the probe, caching the first predicate in a predicate cache associated with the thread, based on the evaluating of the first predicate and cacheability of the first predicate, and transferring control to the thread, based on the caching.

26 Claims, 4 Drawing Sheets

METHOD AND APPARATUS FOR CACHING PREDICATES IN A TRACING FRAMEWORK

BACKGROUND

A tracing framework is used to understand the behavior of complex computer systems. Tracing performed using the tracing framework involves recording data from a location or relating to an occurrence in the software of the computer system. In a tracing framework that offers comprehensive coverage, the framework provides a mechanism to allow events not to be traced or the user may be flooded with unwanted data.

Tracing frameworks use predicates to limit the events traced by only tracing data if a certain condition is found to be true. Predicates are a useful mechanism when the user knows which events are interesting. For example, if the user is only interested in an activity associated with a certain process or a certain file descriptor, the user can define a predicate that obtains knowledge about only that particular process or file descriptor.

Additionally, in a tracing framework that gives a high degree of latitude, evaluating a predicate may have a non-zero cost. Further, if a large number of predicates require evaluation, the cost of evaluating the predicates becomes substantial.

SUMMARY OF INVENTION

In general, in one aspect, an embodiment of the invention relates to a method for caching in a tracing framework, comprising firing a probe associated with a thread, evaluating a first predicate of the probe, caching the first predicate in a predicate cache associated with the thread, based on the evaluating of the first predicate and cacheability of the first predicate, and transferring control to the thread, based on the caching.

In general, in one aspect, an embodiment of the invention relates to a computer system for caching in a tracing framework comprising a processor, a memory, a storage device, and software instructions stored in the memory for enabling the computer system to fire a probe associated with a thread, evaluate a first predicate of the probe, cache the first predicate in a predicate cache associated with the thread, based on the evaluating of the first predicate and cacheability of the first predicate, and transfer control to the thread, based on the caching.

Other aspects of the invention will be apparent from the following description and the appended claims.

DETAILED DESCRIPTION

Figure 1:
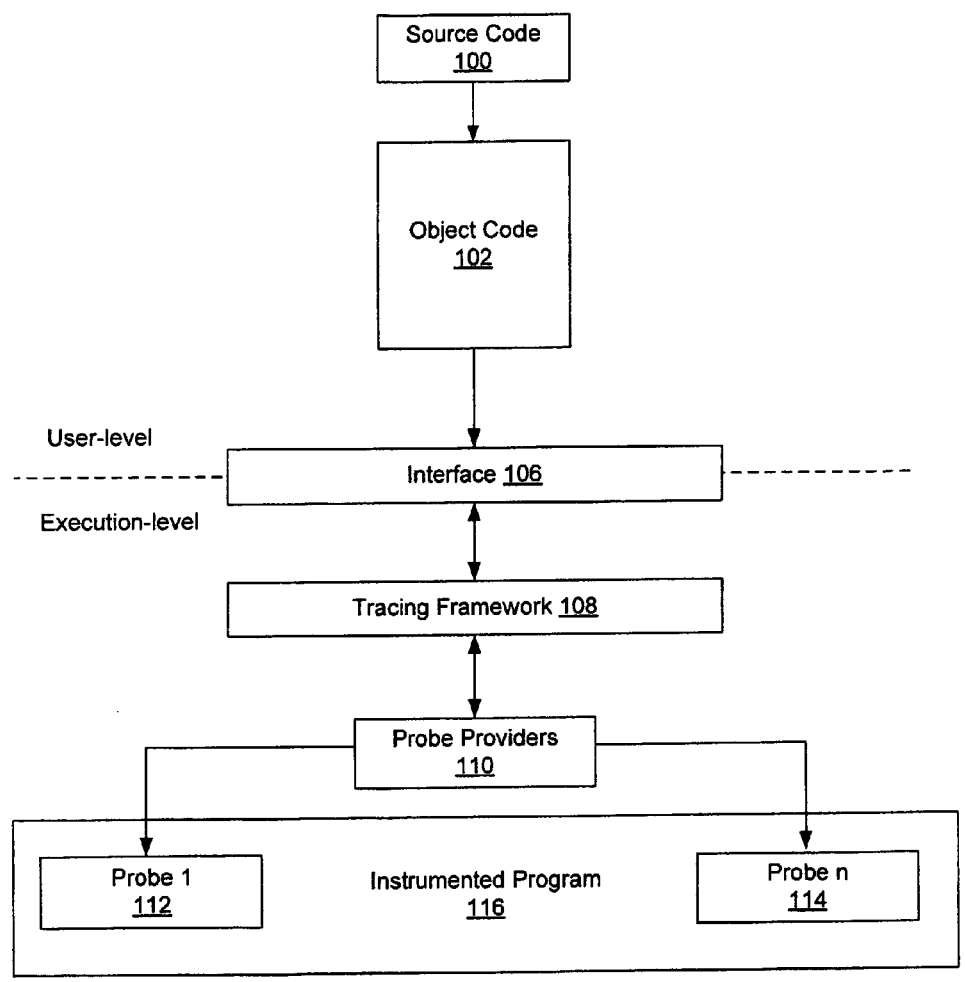
FIG. 1 shows a tracing framework in accordance with one or more embodiments of the present invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

One or more embodiments of the present invention relates to a tracing framework and a method for caching predicates. FIG. 1 shows a tracing framework in accordance with one or more embodiments of the present invention. FIG. 1 shows source code (100), which defines performance-related questions with respect to a software system. Performance-related questions, for example, may relate to processing speed, resource consumption, and/or proper execution, etc.

In an embodiment of the invention, the source code (100) is obtained using a command line or a graphical user interface. Once obtained, the source code (100) is compiled into executable object code (102). Requests from the object code (102) are communicated to an execution-level tracing framework (108) via an execution interface (106). A tracing framework (108) interprets the requests from the object code (102) and forwards the requests to probe providers (110), which activate certain probes (112 and 114) in an instrumented program (116).

The probes (112 and 114) correspond to a particular location and/or activity within the instrumented program (116), and answer a specific performance-related question. Further, these probes (112 and 114) may gather the specified information and store the information accordingly. In one or more embodiments, the probe may also have an identifier (id), which may be cached to avoid unnecessary evaluation.

In one or more embodiments, the probes (112 and 114) may be described in the following psuedo-code:

---
Code Sample 1

---
```
1 probe description
2 /predicate/
  {
3 Action
  }
```
---

In line 1 of the Code Sample 1, the name of a certain probe is defined. Line 2 shows a predicate, which is a pre-determined, conditional statement that determines whether the action (shown at line 3) of the probe is to be executed. The predicate evaluates to a value of true or false, e.g., an integer value of zero or one, or a defined pointer type. One skilled in the art will appreciate that the Boolean values may be reversed.

In one or more embodiments of the present invention, a predicate may be assigned an identifier, for example, a predicate cache identifier (id), which may later be stored with its corresponding probe as a probe cache identifier. In one or more embodiments, the predicate cache id is a thirty-two bit, non-zero integer. One skilled in the art will appreciate that a probe may contain more than one predicate/action pairs. Additionally, one skilled in the art will appreciate that two or more predicates of a probe may be identical.

Line 3 of Code Sample 1 defines the action of the probe that is executed, i.e., the tracing operation. Examples of tracing operations include tracing (or recording data), modifying a state variable, etc.

In one or more embodiments, the present invention caches the predicates in the tracing framework. Generally, caching involves temporarily storing frequently used data to ensure that the data is easily accessible. Caching predicates allows a predicate (or specifically, an evaluation of a predicate) to be temporarily stored and easily referenced.

A predicate, which is known to be false, may be identified and stored in a predicate cache. One skilled in the art will understand that storing a predicate that evaluates to true, is typically undesirable, because the cost of the subsequently executed actions amortizes the cost of caching the predicates.

Figure 2:
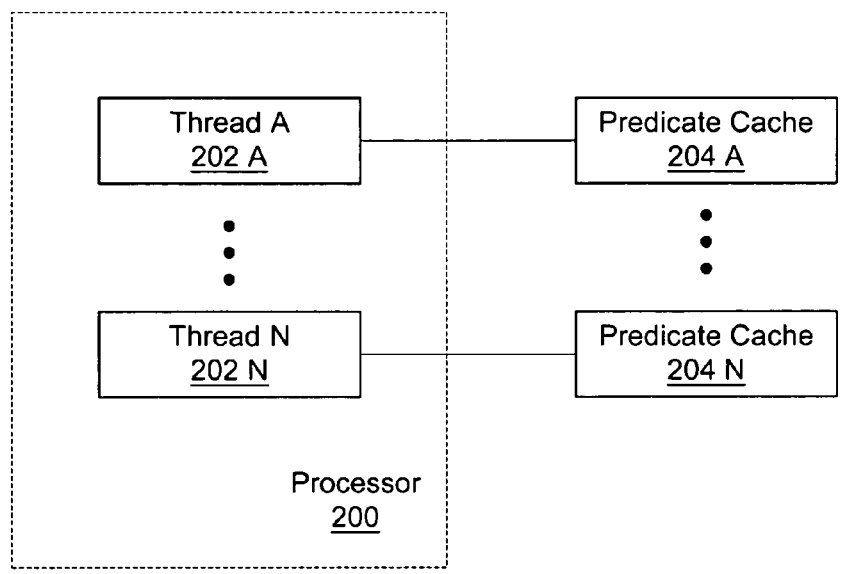
FIG. 2 shows predicate caches in a tracing framework in accordance with one or more embodiments of the present invention.

FIG. 2 shows a tracing framework with predicate caches in accordance with one or more embodiments of the present invention. In FIG. 2, the tracing framework (108) is associated with a processor (200), which executes an instrumented program (e.g., 116 in FIG. 1). Threads (202 A-202 N) are tasks, which are a sub-set of instructions in the instrumented program (116), executing on processor (200). Predicate caches (204 A-204 N) are associated with the threads (202 A-202 N), respectively, and store the predicate of the last cached probe encountered by the particular thread. In particular, the predicate cache id is stored in the predicate cache.

In one or more embodiments of the present invention, only particular predicates may be cached. For example, a predicate of a probe is defined as cacheable if it references (1) an immutable variable, i.e., a variable that does not change or (2) a thread-specific variable, i.e., a variable with a thread-local state. For example, a thread specific variable may include a thread-specific global variable or a thread-specific dynamically allocated variable. If the predicate is cacheable, the predicate is assigned a unique, non-zero identifier, i.e., a predicate cache id. Further, this predicate cache id is stored with the probe as the probe cache identifier. If a cacheable predicate evaluates to false, the predicate's cache identifier is stored in the evaluating thread's predicate cache.

Additionally, in one or more embodiments, more than one predicate may be associated with a single probe. A probe having multiple predicates is defined as cacheable if all the predicates have the same identifier, i.e., the same predicate, which references (1) an immutable variable, or (2) a thread-specific variable. If the predicate is cacheable, the predicate is assigned a unique, non-zero identifier, i.e., a predicate cache id. Similarly, this predicate cache id is stored with the probe as the probe cache identifier. If a cacheable predicate evaluates to false, the predicate's cache identifier is stored in the evaluating thread's predicate cache.

One skilled in the art will also appreciate that predicate caches may be associated per thread and may be of arbitrary size. Further, predicate caches may cache multiple predicate cache identifiers simultaneously.

Figure 3:
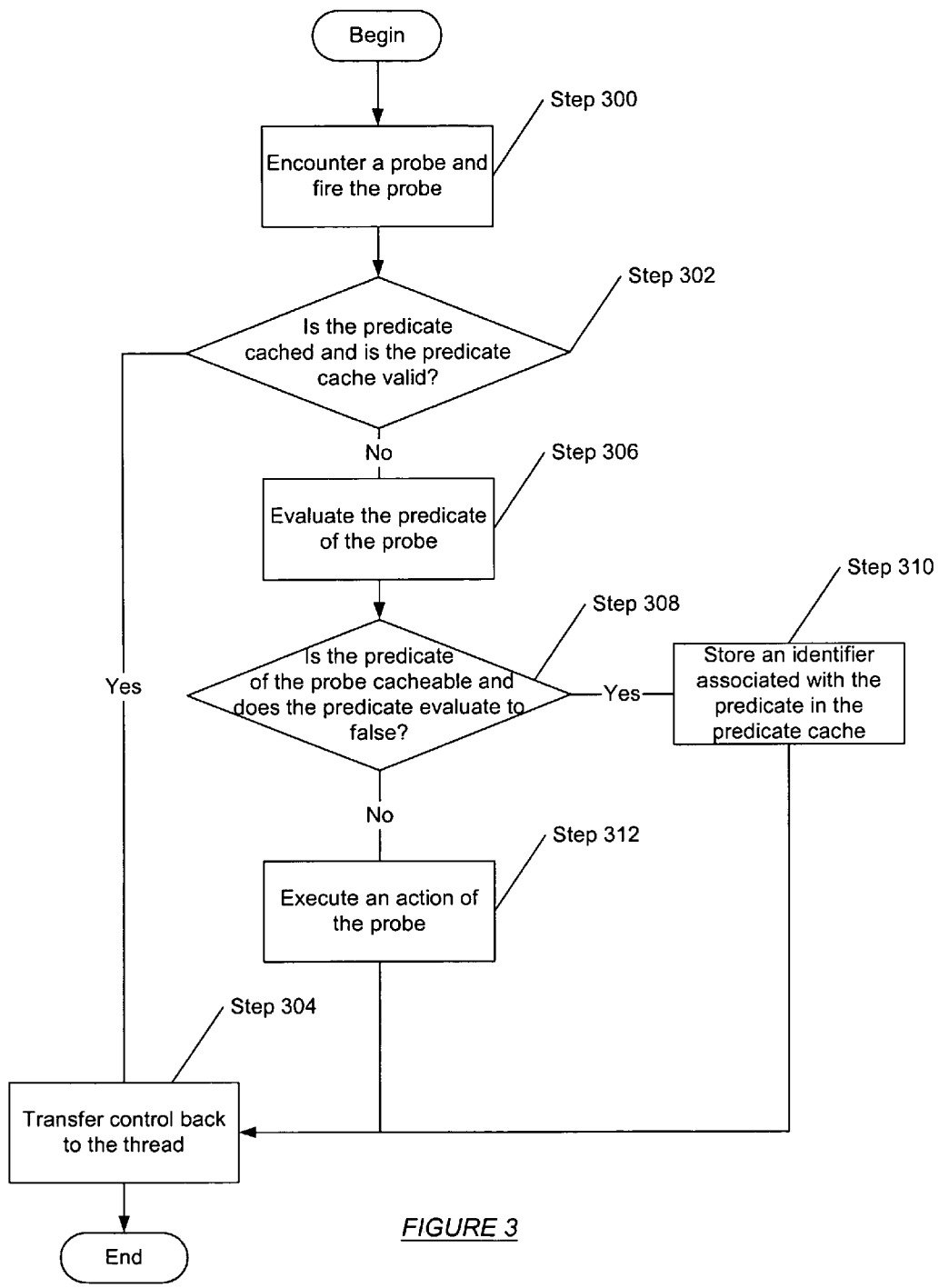
FIG. 3 shows a method for caching predicates in accordance with one or more embodiments of the present invention.

FIG. 3 shows caching predicates during thread execution in accordance with one or more embodiments of the present invention. During thread execution, a probe is encountered in the instruction set and the probe fires (Step 300). At this point, a determination is made whether the predicate of the probe is cached and whether the predicate cache is valid (Step 302). Determining whether the predicate is cached may be accomplished in a variety of ways, for example, checking for equivalency of the probe cache id and the predicate cache id stored in the predicate cache. Additionally, determining whether a predicate cache is valid may be accomplished in a variety of ways, for example, ensuring that the probe cache id and the predicate cache id stored in the predicate cache are both non-zero.

If the predicate of the probe is cached and the predicate cache is valid, then control is transferred back to the thread (Step 304). Otherwise, the predicate of the probe is evaluated (Step 306). If the predicate is cacheable and false (i.e., assuming there is only one predicate in the probe) (Step 308), then the unique, non-zero identifier assigned a priori, i.e., a predicate cache id, is stored in the predicate cache associated with that particular thread (Step 310). Additionally, the predicate may already be identified with a predicate cache id, however, previously evaluated to true. In this case, the previously assigned predicate cache id is stored with the probe and the predicate cache. The probe transfers control to the thread (Step 304). Otherwise, if the predicate is true, then the action of the probe is executed (Step 312) and the probe transfers control to the thread (Step 304).

In one or more embodiments of the present invention, a predicate cache is initially set to zero and updated as described above. Once a predicate, or specifically, a predicate cache id, is associated with the predicate cache, coherency of the predicate cache must be maintained. Coherency relates to maintaining veritable content in the predicate cache, i.e., ensuring that a thread-specific variable referenced in one or more of the predicates has not changed state, thereby rendering the predicate true.

Therefore, at any point during thread execution, if a thread-specific variable is stored, the predicate cache is invalidated by assigning the predicate cache id associated with the predicate cache to zero. Further, if a predicate cache is shared by several probes and, during thread execution, one of the probes is no longer cacheable, then the predicate cache is also invalidated by assigning the predicate cache id associated with the predicate cache to zero.

Figure 4:
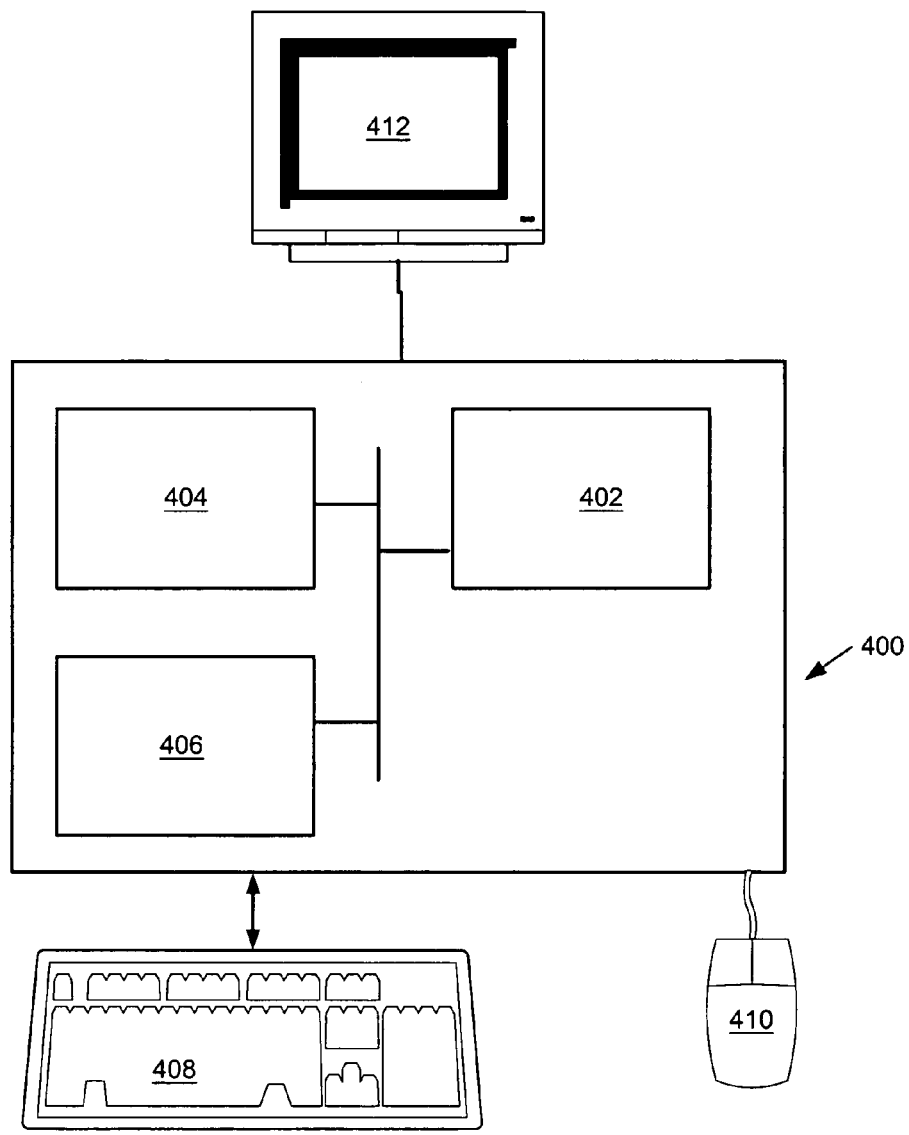
FIG. 4 shows a networked computer system in accordance with one embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network (e.g., the Internet) via a network interface connection (not shown). Those skilled in the art will appreciate that these input and output means may take other forms. Those skilled in the art will appreciate that one or more elements of the aforementioned computer (400) may be located at a remote location and connected to the other elements over a network In one or more embodiments, the present invention allows a predicate to be evaluated without having to fire a probe, thereby reducing costs associated with probe firing. This allows predicates to be used more efficiently in a tracing framework. The present invention provides a mechanism for caching predicates, while maintaining a coherent cache.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for caching in a tracing framework, comprising:
   firing a probe associated with a thread;
   evaluating a first predicate of the probe to determine a first Boolean value, wherein the first Boolean value is false;
   determining that the first predicate is cacheable, wherein the first predicate is cacheable when it is the first predicate is referencing on selected from a group consisting of an immutable variable and a thread-specific variable;

identifying the first predicate using a predicate cache identifier;

storing the, predicate cache identifier with the probe as a probe cache identifier;

caching the first Boolean value and the predicate cache identifier in a predicate cache associated with the thread, based on the first Boolean value being false and the first predicate being cacheable the evaluating of the flint predicate and cacheability of the first predicate; and transferring control to the thread, based on the caching.

2. The method according to claim 1, further comprising: executing an action of the probe when the Boolean value is true.

3. The method according to claim 1, wherein the transferring occurs if the first Boolean value is cached in the predicate cache.

4. The method according to claim 1, wherein the probe further encounters a second predicate of the probe.

5. The method according to claim 4, further comprising: evaluating the second predicate of the probe.

6. The method according to claim 5, wherein evaluating the second predicate comprises determining a second Boolean value of the second predicate.

7. The method according to claim 6, wherein the second Boolean value is true.

8. The method according to claim 7, further comprising: executing an action of the probe.

9. The method according to claim 6, wherein the second Boolean value is false.

10. The method according to claim 9, further comprising: determining whether the second predicate is cacheable.

11. The method according to claim 10, further comprising: identifying the second predicate using the predicate cache identifier, if the first predicate and the second predicate are the same.

12. The method according to claim 11, wherein cacheable is the first predicate referencing an immutable variable and the first predicate and the second predicate having the same identifier.

13. The method according to claim 11, wherein cacheable is the first predicate referencing a thread-specific variable and the first predicate and the second predicate having the same identifier.

14. The method according to claim 1, further comprising: determining whether the first Boolean value is cached; and determining whether the predicate cache is valid.

15. The method according to claim 14, wherein the determining whether the first Boolean value is cached comprises comparing whether a probe cache identifier and a predicate cache identifier stored in the predicate cache are equivalent.

16. The method according to claim 14, wherein determining whether the predicate cache is valid comprises comparing whether a probe cache identifier and a predicate cache identifier stored in the predicate cache are non-zero.

17. The method according to claim 1, further comprising: invalidating the predicate cache.

18. The method according to claim 17, wherein the invalidating comprises setting the predicate cache to zero.

19. The method according to claim 17, wherein the invalidating is a result of a thread-specific variable being stored.

20. The method according to claim 1, further comprising: setting the predicate cache to zero initially.

21. A computer system for caching in a tracing framework comprising:
    a processor;
    a memory;
    a storage device; and
    software instructions stored in memory for enabling the computer system to:
        fire a probe associated with a thread;
        evaluate a predicate of the probe to determine a Boolean value, wherein the Boolean value is false;
        determine that the predicate is cacheable, wherein the predicate is cacheable when is the predicate is predicate is referencing one selected from a group consisting of an immutable variable and a thread-specific variable;
        identify the predicate using a predicate cache identifier;
        store the predicate cache identifier with the probe as a probe cache identifier;
        cache Boolean value and the predicate cache identifier in a predicate cache associated with the thread, based on tile Boolean value being false and the predicate being cacheable; and
        transfer control to the thread, based on the caching.

22. The method of claim 1, wherein false means an integer value of zero.

23. The method of claim 1, wherein false means an integer value of one.

24. The system of claim 21, wherein false means an integer value of zero.

25. The system of claim 21, wherein false means an integer value of one.

26. The method of claim 1, wherein the predicate cache identifier is a thirty-two bit, non-zero integer.

* * * * *